United States Patent [19]

Mine et al.

[11] 4,387,177

[45] Jun. 7, 1983

[54] ROOM TEMPERATURE CURABLE ORGANOPOLYSILOXANE COMPOSITIONS AND METHODS FOR THEIR PREPARATION

[75] Inventors: Katsutoshi Mine, Ichihara; Tadao Tamaki, Kisarazu, both of Japan

[73] Assignee: Toray Silicone Company, Ltd., Tokyo, Japan

[21] Appl. No.: 344,913

[22] Filed: Feb. 2, 1982

Related U.S. Application Data

[63] Continuation-in-part of Ser. No. 237,179, Feb. 23, 1981, abandoned.

[30] Foreign Application Priority Data

Mar. 4, 1980 [JP] Japan ................................ 55/27114
Feb. 24, 1981 [AR] Argentina .............................. 284415

[51] Int. Cl.$^3$ .............................................. C08L 83/06
[52] U.S. Cl. ..................................... 524/425; 524/506; 524/588; 524/788; 525/477; 528/17; 528/18; 528/32
[58] Field of Search ........................... 528/32, 17, 18; 525/477; 524/425

[56] References Cited

U.S. PATENT DOCUMENTS

| | | | |
|---|---|---|---|
| 3,341,486 | 9/1967 | Murphy | 528/34 |
| 3,766,127 | 10/1973 | Clark et al. | 525/477 |
| 3,766,128 | 10/1973 | Brady et al. | 525/477 |
| 3,817,909 | 6/1974 | Toporcer et al. | 528/34 |
| 3,996,184 | 12/1976 | Klosowski | 528/32 |

*Primary Examiner*—Wilbert J. Briggs, Sr.
*Attorney, Agent, or Firm*—Roger H. Borrousch

[57] ABSTRACT

A low modulus silicone rubber which cures at room temperature can be obtained by exposing a composition made from a hydroxyl endblocked polydiorganosiloxane, an aminoxy silicon compound having two aminoxy groups per molecule, such as, methylvinyldi-(N,N-diethylaminoxy)silane, and a hydrolyzable organosilicon compound which has at least three hydrolyzable groups per molecule including oxime, alkoxy, amino, vinyloxy, amide, imide, and lactam such as methyltri(N-methylacetamido)silane or methyltrimethoxysilane. The compositions can be packaged in a single container and, if sealed, remain stable until exposed to moisture. The compositions can be made by a two-step method comprising mixing the aminoxy silicon compound and the hydroxyl endblocked polydiorganosiloxane and thereafter blending in the hydrolyzable organosilicon compound.

25 Claims, No Drawings

ROOM TEMPERATURE CURABLE ORGANOPOLYSILOXANE COMPOSITIONS AND METHODS FOR THEIR PREPARATION

This application is a continuation-in-part application of application Ser. No. 237,179, filed Feb. 23, 1981, now abandoned.

BACKGROUND OF THE INVENTION

1. Field of the Invention

This invention relates to room temperature curable organopolysiloxane compositions. More precisely, this invention relates to room temperature curable organopolysiloxane compositions which are suitable as sealing materials in civil engineering and construction and to methods for producing these compositions. The compositions exhibit storage stability when protected from moisture, but they are cured when exposed to moisture to form highly elastic/low modulus silicone rubbers.

2. Description of the Prior Art

Information is available about room temperature curable organopolysiloxane compositions comprised of an organopolysiloxane containing silicon-bonded hydroxyl groups at the end of the molecular chains and knowledge exists of organosilicone compounds containing at least three silicon-bonded groups per molecule which are hydrolyzable by water e.g., oxime groups, alkoxy groups, amino groups, vinyloxy groups, amide groups, imide groups, lactam groups or aminoxy groups and which serve as crosslinking agents.

However, it was difficult to obtain highly elastic/low modulus silicone rubbers from these organopolysiloxane compositions. That is, high molecular weight substances must be used as the hydroxyl terminated organopolysiloxane in order to obtain silicone rubbers possessing these characteristics. If a high molecular weight substance is used, it creates difficulties in handling due to the high viscosity, causing inefficiency in the manufacturing process and operational problems in extruding products. Thus, there is a limitation on the magnitude of the molecular weight which may be used. Therefore, the physical properties, such as high elongation and low modulus, of silicone rubbers are also limited.

In an attempt to overcome these drawbacks, various room temperature curable organopolysiloxane compositions have been proposed which are comprised of a relatively low viscosity, hydroxyl terminated organopolysiloxane and a bifunctional organosilicone compound as the chain extender. For example, a method for producing highly elastic/low modulus silicone rubbers was disclosed in U.S. Pat. No. 3,341,486 by Robert A. Murphy, issued Sept. 12, 1967. In this patent, a mixture of an organosilicone compound possessing two silicon-bonded aminoxy groups per molecule and serving as the chain extender and an organosilicone compound possessing at least three silicon-bonded aminoxy groups per molecule and serving as the crosslinking agent are added to a hydroxyl terminated organopolysiloxane in order to carry out both the chain extending and crosslinking reactions simultaneously in the presence of water.

However, these room temperature curable organopolysiloxane compositions containing aminoxy groups have the following drawbacks. The aminoxy groups are relatively sensitive to moisture. In addition, the basicity is high and, specifically, chain cleavage of the polydiorganosiloxane occurs in a single package. Because of these drawbacks, the storage stability is insufficient even under closed conditions. The compositions are particularly unstable in the presence of a catalyst.

Other compositions which cure at room temperature to low modulus silicone elastomers are known. For example, Clark et al. in U.S. Pat. No. 3,766,127, issued Oct. 16, 1973, describe obtaining a low modulus silicone rubber from a composition prepared by mixing 100 parts by weight of a hydroxyl endblocked polydiorganosiloxane, 3.5 to 8 parts by weight of a silane of the formula

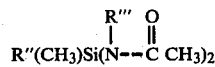

where R" is methyl or vinyl and R''' is methyl, ethyl or phenyl and 0.3 to 4.2 parts by weight of a silane of the formula

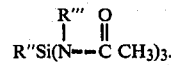

Brady et al. in U.S. Pat. No. 3,766,128, issued Oct. 16, 1973, describe obtaining low modulus silicone rubber from a composition prepared by mixing 100 parts of a hydroxyl endblocked polydiorganosiloxane, 2 to 7.5 parts by weight of methylvinyldi-(N-methylacetamido)-silane, and 0.5 to 4 parts by weight of an aminosilane of the formula

where $R^{IV}$ is alkyl, phenyl, or vinyl, $R^{V}$ is hydrogen or alkyl and $R^{VI}$ is alkyl or phenyl. Toporcer et al. in U.S. Pat. No. 3,817,909, issued June 18, 1974, describe obtaining a low modulus silicone rubber from a composition obtained by mixing 100 parts of a hydroxyl endblocked polydiorganosiloxane, 2 to 20 parts by weight of a silane of the formula

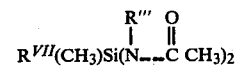

where $R^{VII}$ is methyl, vinyl, or phenyl and R''' is defined above, and 0.25 to 7 parts by weight of an aminoxysilicon compound having 3 to 10 aminoxy groups per molecule.

SUMMARY OF THE INVENTION

This invention provides room temperature curable organopolysiloxane compositions from which high elongation/low modulus silicone rubbers can be produced by overcoming the drawbacks mentioned above. Moreover, the storage stability is excellent even if a catalyst is used. In addition, this invention also proposes methods for producing room temperature curable organopolysiloxane compositions from which high elongation/low modulus silicone rubbers can be produced.

The room temperature curable organopolysiloxane compositions are obtained by mixing a hydroxyl endblocked polydiorganosiloxane, an aminoxy silicon compound having two aminoxy groups per molecule, and a hydrolyzable organosilicon compound having, per molecule, three hydrolyzable groups selected from oxime groups, alkoxy groups, amino groups, vinyloxy groups, amide groups, imide groups, and lactam groups.

DESCRIPTION OF THE INVENTION

This invention relates to a room temperature curable organopolysiloxane composition comprising the product obtained by mixing (A) 100 parts by weight of a hydroxyl endblocked polydiorganosiloxane having a viscosity at 25° C. in the range of 0.00005 to 0.5 m²/s inclusive and in which the organic radicals are monovalent radicals selected from the group consisting of hydrocarbon radicals and halogenated hydrocarbon radicals, (B) an amount of an aminoxy organosilicon compound sufficient to provide at least one mol aminoxy group per one mol hydroxyl group in (A), the aminoxy organosilicon compound having a general formula

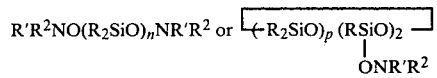

in which each R, R', and R² is a monovalent radical selected from the group consisting of hydrocarbon radicals and halogenated hydrocarbon radicals, n has a value of from 1 to 50 inclusive, and p has a value of from 1 to 5 inclusive, (C) from 0.5 to 20 parts by weight of a hydrolyzable organosilicon compound containing at least three silicon-bonded hydrolyzable groups per molecule, said hydrolyzable groups being selected from the group consisting of oxime groups, alkoxy groups, amino groups, vinyloxy groups, amide groups, imide groups, and lactam groups.

Each component used in this invention is explained below.

Component (A) used in the compositions of this invention is a polydiorganopolysiloxane with the general formula

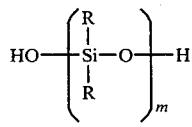

which possesses hydroxyl groups at both ends. In this formula, R represents monovalent hydrocarbon radicals, and halogenated monovalent hydrocarbon radicals, such as those selected from among methyl, ethyl, propyl, octyl, phenyl, vinyl, and 3,3,3-trifluoropropyl groups. The value of m is such that the viscosity at 25° C. is 0.00005 to 0.5 m²/s. If the viscosity at 25° C. exceeds 0.5 m²/s, the workability in the preparation of the compositions of this invention becomes poor, and the compositions are difficult to extrude from a container, such as a cartridge, a tube, or a plastic film container such as described in Belgium Patent Publication No. 870,566, published Mar. 19, 1979. On the other hand, if the viscosity is too low, high elongation and low modulus cannot be obtained. A preferred viscosity range is 0.00005 to 0.05 m²/s. Component (A) can be a copolymer as long as silicon-bonded hydroxyl groups are present at the ends of the molecular chain. Alternatively, a mixture of two or more types of component (A) can be used. In this case, polydiorganosiloxanes which have a viscosity greater than 0.5 m²/s can be used for blending, as long as, the final viscosity attained after blending is 0.5 m²/s or less.

Component (B) used in this invention is an important component for forming high elongation/low modulus silicone rubbers by the chain extension of the polydiorganosiloxane of (A). Component (B) is an aminoxy silicon compound selected from among aminoxysilanes or aminoxysiloxanes possessing two silicon-bonded aminoxy groups per molecule which are expressed by the general formulae

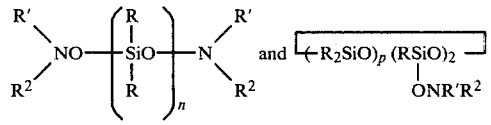

where each R, R' and R² is a monovalent hydrocarbon radical which includes alkyl groups such as methyl, ethyl, and propyl groups; alkenyl groups such as vinyl, allyl, and butadienyl groups; aryl groups such as phenyl, xenyl, and naphthyl groups; cycloalkyl groups such as cyclohexyl group; cycloalkenyl groups such as the cyclohexenyl group; aralkyl groups such as the benzyl group; alkaryl groups such as tolyl and xylyl groups; and their halogenated derivatives. R, R', and R² can be identical or different groups, n is 1 to 50 and p is 1 to 5.

Examples of aminoxysilanes and aminoxysiloxanes are as follows:

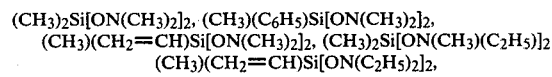

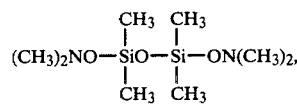

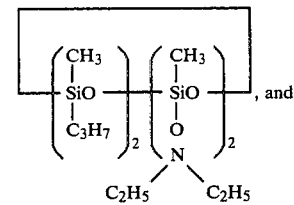

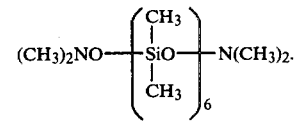

Component (B) must be added in an amount such that the number of moles of aminoxy group is at least equal to the total number of moles of silicon-bonded hydroxyl group in component (A), regardless of the blending method. If the amount added is less than equimolar, hydroxyl groups of component (A) remain, particularly in the two-step blending method, and the remaining hydroxyl groups react with component (C) resulting in an impairment of storage stability. Preferably, component (B) is added in an amount of corresponding to 2 to 15 moles of aminoxy groups per mol of hydroxyl group of component (A). A mixture of two or more types of aminoxy silicon compound can be used as component (B).

Component (C) used in this invention is a hydrolyzable organosilicon compound added as a crosslinking agent. These hydrolyzable organosilicon compounds can be organosilanes and organosiloxanes with a degree of polymerization of 1–50. The hydrolyzable organosilicon compounds contain at least three silicon-bonded groups per molecule which are hydrolyzable by water, e.g., oxime groups, alkoxy groups, amino groups, vinyloxy groups, amide groups, imide groups or lactam groups. Cyclic siloxanes are included. Except for tetrafunctional organosilanes, these compounds generally contain silicon-bonded monovalent hydrocarbon radicals or halogenated monovalent hydrocarbon radicals. These monovalent radicals are the same as those expressed by R in the formula for component (B).

Some examples of component (C) are as follows: oxime silanes and oxime siloxanes such as

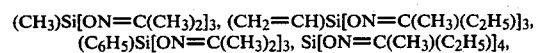

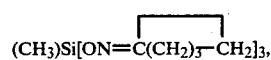

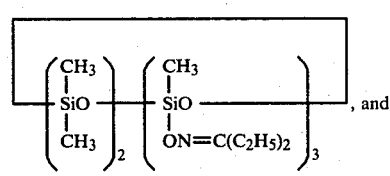

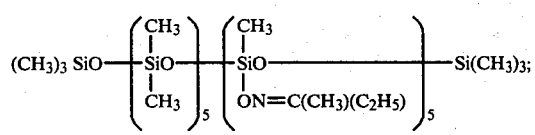

alkoxysilanes and alkoxysiloxanes such as $(CH_3)Si(OCH_3)_3$, $(CH_3)Si(OC_2H_5)_3$, $(CH_2=CH)Si(OCH_3)_3$, $(C_6H_5)Si(OC_2H_5)_3$, $Si(OC_2H_5)_4$,

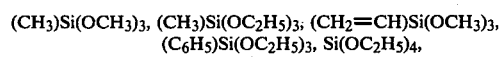

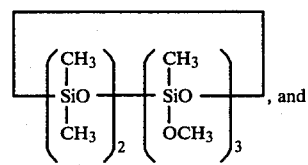

aminosilanes and aminosiloxanes such as $(CH_3)Si[N(CH_3)_2]_3$, $(CH_2=CH)Si[N(CH_3)_2]_3$, $(C_6H_5)Si[N(CH_3)_2]_3$, $Si[N(C_2H_5)_2]_4$ and

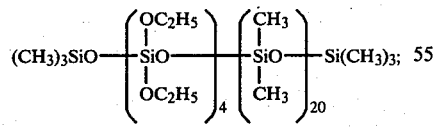

α,β-vinyloxysilanes and α,β-vinyloxysiloxanes such as

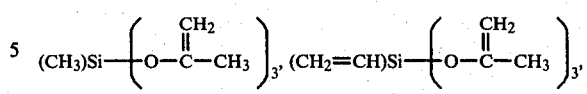

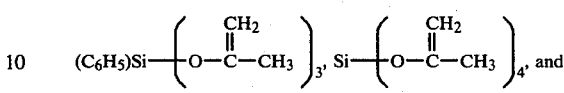

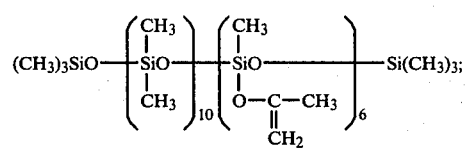

amide silanes and amide siloxanes such as

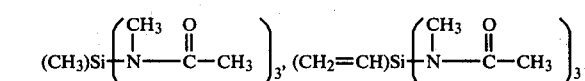

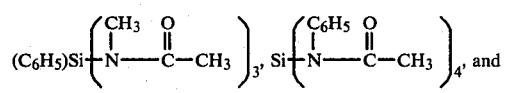

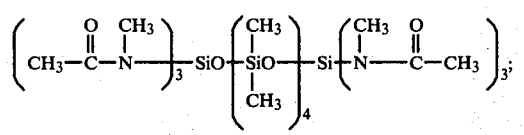

imide silanes and imide siloxanes such as

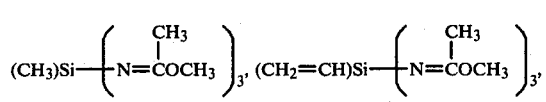

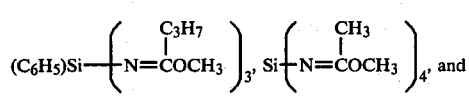

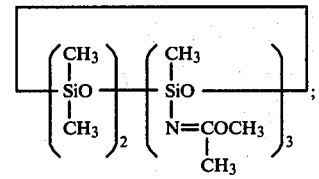

and lactam silanes and lactam siloxanes such as

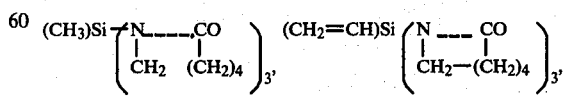

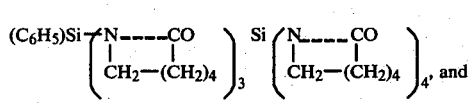

-continued

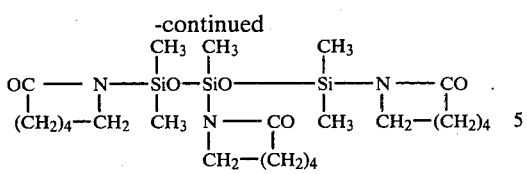

A mixture of two or more types of hydrolyzable organosilicon compounds possessing identical hydrolyzable groups can be used as component (C). Alternatively, a combination of two or more types of hydrolyzable organosilicon compounds having different hydrolyzable groups can be used. The amount of (C) varies with the type, molecular weight, and number of functional groups in component (C); the molecular weight of component (A) and the degree of chain extension by component (B). The amount of component (C) ranges from 0.5 to 20 parts by weight based on 100 parts by weight of component (A). Preferably, the amount of (C) is from 2 to 10 parts by weight based on 100 parts by weight of (A).

The compositions of this invention are preferably produced by a two-step blending method. Component (B) is added to component (A) and the resulting mixture if homogeneously blended in any of a variety of mixers. Subsequently, component (C) is added and the mixture is again homogeneously blended. Because components (B) and (C) are sensitive to moisture, the blending operations and resulting products should be handled in a manner to avoid exposure to moisture. In this manner, the storage stability is improved and satisfactory chain extension is assured so that high elongation/low modulus silicone rubbers are produced. When an alkoxy-substituted silicone compound is used as the crosslinking agent, gelation is likely to occur upon blending a mixture of a chain extender and a crosslinking agent or upon blending both agents individually at the same time; thus, the two-step blending method is preferred. However, the application of this invention is not limited to this method. The following methods are also applicable: the addition of a mixture of components (B) and (C) to component (A) and the addition of components (B) and (C) individually to component (A) at the same time. The compositions of this invention are preferably prepared for storage in a single package.

In addition to components (A), (B) and (C) of this invention, conventional catalysts which catalyze the condensation reaction, can be used. In the case of the two-step blending method, the catalyst is preferably added to component (C). However, the invention is not limited to this method. For example, the catalysts can be metal salts of organic carboxylic acids such as the metal salts of saturated aliphatic carboxylic acids, unsaturated aliphatic carboxylic acids and aromatic carboxylic acids where the metal can be tin, lead, iron, antimony, zirconium, cadmium, titanium, bismuth, calcium, manganese, and barium. In addition, titanates can be used. A titanate catalyst is preferably used to accelerate the curing rate of compositions containing an alkoxy crosslinker, but it is not essential. Examples of titanate catalysts are tetrabutyltitanate, tetraisopropyltitanate, di-butoxy titanium acetylacetonate, and bis-(acetylacetonate) titanium. The amount of titanate catalyst is preferably 0.05 to 1 part by weight per 100 parts by weight of (A).

Additives such as fume silica, precipitated silica, quartz powder, diatomaceous earth, titanium, dioxide, calcium carbonate, carbon black, asbestos powder, alumina, glass powder, glass beads, glass balloons, glass fibers, iron oxide, zinc oxide, organic resins, pigments, dyes, antioxidants, adhesion improvers, heat stabilizers, and flame retardants can be added to the compositions of this invention. The surfaces of the fillers can be treated with organosilanes, silazanes, organic compounds, or low molecular polysiloxanes. These fillers and additives are preferably added to component (A). If desirable, an organic solvent can be used.

The compositions of this invention are suitable as sealing materials. When stored in a container which is not penetrated by moisture, the viscosity does not change over a long-term storage period. In particular, the storage stability of compositions prepared by the two-step blending method is excellent. Because the composition of this invention cures and chain extends, component (A) can be a relatively low viscosity polydiorganosiloxane which permits relatively easy extrusion from a cartridge or tube. The physical properties of the cured silicone rubbers demonstrate a high elongation and low modulus; this, easily deforms and recovers from compression and extension. Therefore, the compositions of this invention are particularly suitable as sealing materials in construction and civil engineering.

Examples of this invention will be explained below. "Parts" in the following examples are "parts by weight." The viscosity was measured at 25° C. The abbreviations used in the chemical formulas in the following examples are as follows: Me: methyl group, Et: ethyl group, Bu: n-butyl group, Ph: phenyl group and Vi: vinyl group.

EXAMPLE 1

A mixture was prepared, by blending in a planetary mixer for one hour, from 100 parts of calcium carbonate and 100 parts of a hydroxyl endblocked polydimethylsiloxane having a viscosity of 0.014 m²/s. Subsequently, the mixture was thoroughly blended in a three-roll mixer. Using a mixer, 3.6 parts of (Me)(Vi)Si[ON(Et)₂]₂ was added as a chain extender to the mixture. After thoroughly blending the mixture, 3 parts of

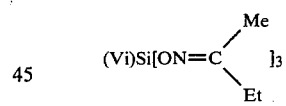

was added as a crosslinking agent to obtain the composition of Experiment Number 1. The resulting mixture was degassed under vacuum. The following compositions were also prepared under the same conditions as described above: amounts of crosslinking agent: 5 parts, 7 parts and 10 parts (Exp. No. 2-4), addition of a premixture of chain extender and crosslinking agent, a one-step method, (Exp. No. 5) and no addition of chain extender for comparison (Comparative Example 1). Each composition was formed into a 2 mm thick sheet and cured at room temperature by allowing the sheet to stand for 7 days. The physical properties were determined according to the method specified in JIS A 5758. The results are reported in Table I.

As shown in Table I, silicone rubbers with an excellent high elongation/low modulus were produced from each composition prepared in the examples of this invention compared to Comparative Example 1. Silicone rubbers with an excellent high elongation/low modulus were produced by the two-step blending method compared to conventional one-step blending. The compositions prepared in Experiments Numbers 2, 5 and Comparative Example 1 were each filled into an aluminum tube and sealed immediately after preparation. After being stored at room temperature for 6 months, the condition of each composition was examined. In Experiment Numbers 2 and 5, no changes were found after the 6 month storage period. The composition prepared in Comparative Example 1 had cured in the tube.

TABLE I

| | Experiment Number | | | | | |
|---|---|---|---|---|---|---|
| | 1 | 2 | 3 | 4 | 5 | 1 |
| Components | | | | | | |
| Polydimethylsiloxane, parts | 100 | 100 | 100 | 100 | 100 | 100 |
| Calcium Carbonate, parts | 100 | 100 | 100 | 100 | 100 | 100 |
| MeViSi(ONEt$_2$)$_2$, parts | 3.6 | 3.6 | 3.6 | 3.6 | 3.6 | — |
| ViSi(ON=CMeEt)$_3$, parts | 3 | 5 | 7 | 10 | 5 | 5 |
| Mixing Method, steps | 2 | 2 | 2 | 2 | 1 | — |
| Properties | | | | | | |
| Hardness | 8 | 14 | 16 | 20 | 15 | 25 |
| 150% Modulus, kPa | 121.6 | 211.8 | 247.1 | 279.5 | 223.6 | 500.1 |
| Elongation at break, % | 1590 | 1090 | 790 | 730 | 920 | 380 |
| Tensile strength at break, kPa | 883 | 902 | 883 | 892 | 883 | 1079 |
| Storage stability* | — | NC | — | — | NC | C |

*Viscosity and extrusion status after being stored at room temperature for 6 months. NC = no changes in viscosity and good extrusion; IV = increased viscosity, but extrusion was possible; and C = cured in the tube.

EXAMPLE 2

A mixture was prepared, by blending in a planetary mixer for one hour, from 100 parts of calcium carbonate and 100 parts of hydroxyl endblocked polydimethylsiloxane described in Example 1. Subsequently, the mixture was further blended in a three-roll mixer. Using a mixer, 4 parts of (Me)(Vi)Si[ON(Et)$_2$]$_2$ was added as a chain extender and the mixture was thoroughly blended. A mixture of 3 parts of (Me)Si(OMe)$_3$ as a crosslinking agent and 0.2 parts tetrabutyltitanate catalyst was blended with the above mixture to produce the composition of Experiment Number 6. The following compositions were also prepared under the same conditions as mentioned above: addition of 0.2 part of dibutyltindioctoate catalyst to compositions containing a crosslinking agent other than (Me)Si(OMe)$_3$ of the type and in the amount shown in Table II (Experiment Numbers 8-9); addition of a premix of a chain extender and a crosslinking agent (Experiment Number 10) and no addition of a chain extender agent as a comparative example (Comparative Example 2). Experiment No. 10 and Comparative Example 2 contained 0.2 part of tetrabutyltitanate catalyst. Each composition was cured under the same conditions as in Example 1 and the physical properties were determined. Each composition was filled into an aluminum tube as in Example 1 and stored at room temperature for 6 months. The storage stability was then examined and the results obtained are reported in Table II.

TABLE II

| | Experiment Number | | | | | Comparative Example |
|---|---|---|---|---|---|---|
| | 6 | 7 | 8 | 9 | 10 | 2 |
| Components | | | | | | |
| Polydimethylsiloxane, parts | 100 | 100 | 100 | 100 | 100 | 100 |
| Calcium Carbonate, parts | 100 | 100 | 100 | 100 | 100 | 100 |
| MeViSi(ONEt$_2$)$_2$, parts | 4 | 4 | 4 | 4 | 4 | — |
| MeSi(OMe)$_3$, parts | 3 | 6 | — | — | 6 | 6 |
| MeSi(NMeBu)$_3$, parts | — | — | 6 | — | — | — |
| MeSi(OC(=CH$_2$)Me)$_3$, parts | — | — | — | 6 | — | — |
| Mixing Method, steps | 2 | 2 | 2 | 2 | 1 | — |
| Properties | | | | | | |
| Hardness | 7 | 12 | 14 | 13 | 13 | 23 |
| 150% Modulus, kPa | 106 | 194 | 199 | 196 | 206 | 441 |
| Elongation at break, % | 1650 | 1180 | 1110 | 1150 | 970 | 420 |
| Tensile strength at break, kPa | 853 | 883 | 892 | 883 | 883 | 1030 |
| Storage stability** | NC | NC | NC | NC | IV | C |

**See footnote of Table I

EXAMPLE 3

As shown in Table III, the amount of chain extender was increased to 5 parts, different types of crosslinking agents, and 0.2 part of dibutyltindilaurate as the catalyst were used. The experiment was carried out under the same conditions as in Example 2 except for the changes mentioned above. The results obtained are reported in Table III. As shown in Table III, the results were found to be similar to those obtained in Example 2.

EXAMPLE 4

A mixture of 100 parts of a hydroxyl endblocked polydiorganosiloxane having 95 mol % dimethylsiloxane units and 5 mol % methylphenylsiloxane units and a viscosity of 0.003 m$^2$/s was homogeneously blended with 100 parts of calcium carbonate. To the mixture 7 parts of

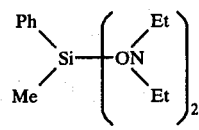

was added as a chain extender and the mixture was thoroughly blended. Subsequently, 4 parts of

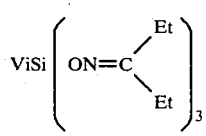

crosslinking agent and 0.2 part of dibutyltindilaurate were blended with the above mixture to obtain the composition of Experiment Number 16. The following compositions were also prepared under the same conditions: addition of MeSi(OMe)$_3$ as the crosslinking agent (Experiment Number 17); addition of

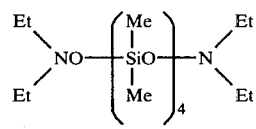

chain extender with the above-mentioned two crosslinking agents (Experiment Numbers 18 and 19). When MeSi(OMe)$_3$ was used as the crosslinking agent, 0.2 part of tetrabutyltitanate was used as the catalyst. A composition was also prepared from the same ingredients as used in Experiment Number 16 by a one-step blending method (Experiment Number 20). As a comparative example, a composition was prepared from the same ingredients as used in Experiment Number 16 without using the chain extender (Comparative Example 4). Similar tests were conducted as in Examples 1 to 3 on each composition prepared above. The obtained results are reported in Table IV.

TABLE IV

| | Experiment Number | | | | | Comparative Example |
|---|---|---|---|---|---|---|
| | 16 | 17 | 18 | 19 | 20 | 4 |
| Components | | | | | | |
| Polyorganosiloxane, parts | 100 | 100 | 100 | 100 | 100 | 100 |
| Calcium Carbonate, parts | 100 | 100 | 100 | 100 | 100 | 100 |
| MePhSi(ONEt$_2$)$_2$, parts | 7 | 7 | — | — | 7 | — |
| Et$_2$NO(Me$_2$SiO)$_4$NEt$_2$, parts | — | — | 10 | 10 | — | — |
| ViSi(ON=CEt$_2$)$_3$, parts | 4 | — | 4 | — | 4 | 4 |
| MeSi(OMe)$_3$, parts | — | 4 | — | 4 | — | — |
| Mixing Method, steps | 2 | 2 | 2 | 2 | 1 | — |
| Properties | | | | | | |
| Hardness | 16 | 15 | 14 | 14 | 16 | 25 |
| 150% Modulus, kPa | 210 | 216 | 209 | 211 | 226 | 521 |
| Elongation at break, % | 1170 | 1080 | 1260 | 1190 | 930 | 360 |
| Tensile strength at break, kPa | 941 | 1020 | 961 | 1030 | 1000 | 1314 |
| Storage stability** | NC | NC | NC | NC | IV | C |

**See footnote of Table I

That which is claimed is:

1. A room temperature curable organopolysiloxane composition comprising the product obtained by mixing
   (A) 100 parts by weight of a hydroxyl endblocked polydiorganosiloxane having a viscosity at 25° C. in the range 0.00005 to 0.5 m$^2$/s inclusive and in which the organic radicals are monovalent radicals selected from the group consisting of hydrocarbon radicals and halogenated hydrocarbon radicals,
   (B) an amount of an aminoxy organosilicon compound sufficient to provide at least one mol

TABLE III

| | Experiment Number | | | | | Comparative Example |
|---|---|---|---|---|---|---|
| | 11 | 12 | 13 | 14 | 15 | 3 |
| Components | | | | | | |
| Polydimethylsiloxane, parts | 100 | 100 | 100 | 100 | 100 | 100 |
| Calcium Carbonate, parts | 100 | 100 | 100 | 100 | 100 | 100 |
| MeViSi(ONEt$_2$)$_2$, parts | 5 | 5 | 5 | 5 | 5 | — |
| MeSi(N(Me)C(O)Me)$_3$, parts | 3 | 6 | — | — | 6 | 6 |
| MeSi(N=C(Me)OMe)$_3$, parts | — | — | 6 | — | — | — |
| MeSi(N(CH$_2$(CH$_2$)$_4$)C=O)$_3$, parts | — | — | — | 6 | — | — |
| Dibutyltindilaurate, parts | 0.2 | 0.2 | 0.2 | 0.2 | 0.2 | 0.2 |
| Mixing Method, steps | 2 | 2 | 2 | 2 | 1 | — |
| Properties | | | | | | |
| Hardness | 8 | 13 | 13 | 14 | 13 | 21 |
| 150% Modulus, kPa | 113 | 206 | 216 | 213 | 220 | 466 |
| Elongation at break, % | 1520 | 1080 | 1050 | 1060 | 960 | 380 |
| Tensile strength at break, kPa | 814 | 873 | 892 | 863 | 863 | 1000 |
| Storage stability** | NC | NC | NC | NC | IV | C |

**See footnote of Table I aminoxy group per one mol hydroxyl group in (A), the aminoxy organosilicon compound having a general formula

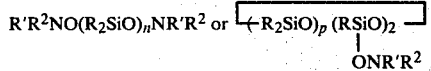
$$R'R^2NO(R_2SiO)_nNR'R^2 \text{ or } [-R_2SiO)_p(RSiO)_2-]$$
$$\phantom{R'R^2NO(R_2SiO)_nNR'R^2 \text{ or } [-R_2SiO)_p(RS}|$$
$$\phantom{R'R^2NO(R_2SiO)_nNR'R^2 \text{ or } [-R_2SiO)_p(RSi}ONR'R^2$$

in which each R, R', and $R^2$ is a monovalent radical selected from the group consisting of hydrocarbon radicals and halogenated hydrocarbon radicals, n has a value of from 1 to 50 inclusive, and p has a value of from 1 to 5 inclusive, (C) from 0.5 to 20 parts by weight of a hydrolyzable organosilicon compound containing at least three silicon-bonded hydrolyzable groups per molecule, said hydrolyzable groups being selected from the group consisting of oxime groups, alkoxy groups, amino groups, vinyloxy groups, amide groups, imide groups, and lactam groups.

2. The room temperature curable organopolysiloxane composition according to claim 1 in which (A), (B), and (C) are mixed and stored under conditions excluding moisture, but cure when exposed to moisture.

3. The composition according to claim 1 in which a filler is present.

4. The composition according to claim 2 in which a filler is present.

5. The composition according to claim 2 in which the hydroxyl endblocked polydiorganosiloxane of (A) has a viscosity at 25° C. in the range of 0.00005 to 0.05 m²/s inclusive, the amount of aminoxy silicon compound in (B) is sufficient to provide from 2 to 15 inclusive mols of aminoxy group per one mol of hydroxyl group in (A), and a catalyst, (D), for curing, is present.

6. The composition according to claim 4 in which the hydroxyl endblocked polydiorganosiloxane of (A) has a viscosity at 25° C. in the range of 0.00005 to 0.05 m²/s inclusive, the amount of aminoxy silicon compound in (B) is sufficient to provide from 2 to 15 inclusive mols of aminoxy group per one mol of hydroxyl group in (A).

7. The composition according to claim 6 in which the hydrolyzable organosilicon compound of (C) is present in an amount of 2 to 10 parts by weight inclusive.

8. The composition according to claim 7 in which the organic radicals of the hydroxyl endblocked polydiorganosiloxane in (A) are methyl.

9. The composition according to claim 8 in which the aminoxy silicon compound of (B) is a compound of the formula

$$(CH_3)(CH_2=CH)Si[ON(CH_2CH_3)_2]_2,$$

the hydrolyzable organosilicon compound of (C) is the compound of the formula

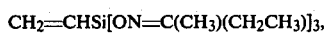
$$CH_2=CHSi[ON=C(CH_3)(CH_2CH_3)]_3,$$

and the filler is calcium carbonate.

10. The composition according to claim 6 in which a catalyst, (D), for curing, is present.

11. The composition according to claim 10 in which the hydrolyzable organosilicon compound of (C) is present in an amount of 2 to 10 parts by weight inclusive.

12. The composition according to claim 11 in which the organic radicals of the hydroxyl endblocked polydiorganosiloxane in (A) are methyl.

13. The composition according to claim 12 in which the aminoxy silicon compund of (B) is the compound of the formula

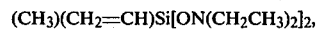
$$(CH_3)(CH_2=CH)Si[ON(CH_2CH_3)_2]_2,$$

the hydrolyzable organosilicon compound of (C) is methyltrimethoxysilane, the catalyst, (D), is tetrabutyltitanate, and the filler is calcium carbonate.

14. The composition according to claim 12 in which the aminoxy silicon compound of (B) is the compound of the formula

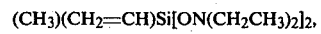
$$(CH_3)(CH_2=CH)Si[ON(CH_2CH_3)_2]_2,$$

the hydrolyzable organosilicon compound of (C) is a compound represented by the formula

$$CH_3Si[N(CH_3)(CH_2CH_2CH_2CH_3)]_3,$$

the catalyst, (D), is dibutyltindioctoate, and the filler is calcium carbonate.

15. The composition according to claim 12 in which the aminoxy silicon compound of (B) is the compound of the formula

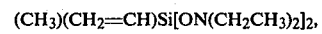
$$(CH_3)(CH_2=CH)Si[ON(CH_2CH_3)_2]_2,$$

the hydrolyzable organosilicon compound of (C) is a compound represented by the formula

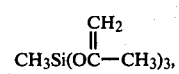
$$\phantom{CH_3Si(OC}\overset{CH_2}{\underset{\|}{}}$$
$$CH_3Si(OC-CH_3)_3,$$

the catalyst, (D), is dibutyltindioctoate, and the filler is calcium carbonate.

16. The composition according to claim 12 in which the aminoxy silicon compound of (B) is the compound of the formula

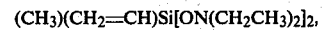
$$(CH_3)(CH_2=CH)Si[ON(CH_2CH_3)_2]_2,$$

the hydrolyzable organosilicon compound of (C) is a compound represented by the formula

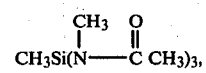
$$\phantom{CH_3Si(N}\overset{CH_3}{\underset{|}{}}\phantom{--}\overset{O}{\underset{\|}{}}$$
$$CH_3Si(N{-\!\!-\!\!-}C\ CH_3)_3,$$

the catalyst, (D), is dibutyltindilaurate, and the filler is calcium carbonate.

17. The composition according to claim 12 in which the aminoxy silicon compound of (B) is the compound of the formula

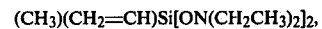
$$(CH_3)(CH_2=CH)Si[ON(CH_2CH_3)_2]_2,$$

the hydrolyzable organosilicon compound of (C) is a compound represented by the formula

$$CH_3Si[N=C(CH_3)(OCH_3)]_3,$$

the catalyst, (D), is dibutyltindilaurate, and the filler is calcium carbonate.

18. The composition according to claim 12 in which the aminoxy silicon compound of (B) is the compound of the formula (CH$_3$)(CH$_2$=CH)Si[ON(CH$_2$CH$_3$)$_2$]$_2$, the hydrolyzable organosilicon compound of (C) is a compound represented by the formula

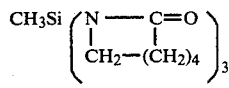

the catalyst, (D), is dibutyltindilaurate, and the filler is calcium carbonate.

19. The composition according to claim 11 in which the organic radicals of the hydroxyl endblocked polydiorganosiloxane in (A) are methyl and phenyl.

20. The composition according to claim 19 in which the aminoxy silicon compound of (B) is the compound of the formula (C$_6$H$_5$)(CH$_3$)Si[ON(CH$_2$CH$_3$)$_2$]$_2$, the hydrolyzable organosilicon compound of (C) is a compound represented by the formula CH$_2$=CHSi[ON=C(CH$_2$CH$_3$)$_2$]$_3$, the catalyst, (D), is dibutyltindilaurate, and the filler is calcium carbonate.

21. The composition according to claim 19 in which the aminoxy silicon compound of (B) is the compound of the formula (CH$_3$CH$_2$)$_2$NO[(CH$_3$)$_2$SiO]$_4$N(CH$_2$CH$_3$)$_2$, the hydrolyzable organosilicon compound of (C) is a compound represented by the formula (CH$_2$=CH)Si[ON=C(CH$_2$CH$_3$)$_2$]$_3$, the catalyst, (D), is dibutyltindilaurate, and the filler is calcium carbonate.

22. The composition according to claim 19 in which the aminoxy silicon compound of (B) is the compound of the formula (C$_6$H$_5$)(CH$_3$)Si[ON(CH$_2$CH$_3$)$_2$]$_2$, the hydrolyzable organosilicon compound of (C) is methyltrimethoxysilane, the catalyst, (D), is tetrabutyltitanate, and the filler is calcium carbonate.

23. The composition according to claim 19 in which the aminoxy silicon compound of (B) is the compound of the formula (CH$_3$CH$_2$)$_2$NO[(CH$_3$)$_2$SiO]$_4$N(CH$_2$CH$_3$)$_2$, the hydrolyzable organsilicon compound of (C) is methyltrimethoxysilane, the catalyst, (D), is tetrabutyltitanate, and the filler is calcium carbonate.

24. A method of making a room temperature curable organopolysiloxane composition comprising
(I) mixing under essentially anhydrous conditions to form a homogeneous blend
   (A) 100 parts by weight of a hydroxyl endblocked polydiorganosiloxane having a viscosity at 25° C. in the range of 0.00005 to 0.5 m$^2$/s inclusive and in which the organic radicals are monovalent radicals selected from the group consisting of hydrocarbon radicals and halogenated hydrocarbon radicals, and
   (B) an amount of an aminoxy organosilicon compound sufficient to provide 2 to 15 mols of aminoxy group per mol of hydroxyl group in (A), the aminoxy organosilicon compound having a general formula

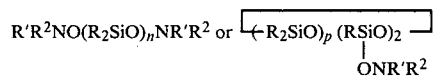

in which each R, R', and R$^2$ is a monovalent radical selected from the group consisting of hydrocarbon radicals and halogenated hydrocarbon radicals, n has a value of from 1 to 50 inclusive, and p has a value of from 1 to 5 inclusive,
(II) blending with the homogeneous blend of (I) under essentially anhydrous conditions, (C) from 0.5 to 20 parts by weight of a hydrolyzable organosilicon compound containing at least three silicon-bonded hydrolyzable groups per molecule, said hydrolyzable groups being selected from the group consisting of oxime groups, alkoxy groups, amino groups, vinyloxy groups, amide groups, imide groups, and lactam groups, and thereafter
(III) placing the resulting product of (II) in a storage container which provides essentially anhydrous storage conditions.

25. A method of making a room temperature curable organopolysiloxane composition comprising
(I) mixing
   (B) an amount of aminoxy organosilicon compound sufficient to provide at least one mol aminoxy group per one mol hydroxyl group in (A), the aminoxy organosilicon compound having a general formula

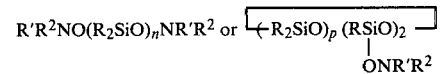

in which each R, R', and R$^2$ is a monovalent radical selected from the group consisting of hydrocarbon radicals and halogenated hydrocarbon radicals, n has a value of from 1 to 50 inclusive, and p has a value of from 1 to 5 inclusive,
   (C) from 0.5 to 20 parts by weight of a hydrolyzable organosilicon compound containing at least three silicon-bonded hydrolyzable groups per molecule, said hydrolyzable groups being selected from the group consisting of oxime groups, alkoxy groups, amino groups, vinyloxy groups, amide groups, imide groups, and lactam groups,
(II) blend the resulting product of (I) with
   (A) 100 parts by weight of a hydroxyl endblocked polydiorganosiloxane having a viscosity at 25° C. in the range 0.00005 to 0.5 m$^2$/s inclusive and in which the organic radicals are monovalent radicals selected from the group consisting of hydrocarbon radicals and halogenated hydrocarbon radicals.

* * * * *

UNITED STATES PATENT AND TRADEMARK OFFICE
CERTIFICATE OF CORRECTION

PATENT NO. : 4,387,177

DATED : June 7, 1983

INVENTOR(S) : Katsutoshi Mine, Tadao Tamaki

It is certified that error appears in the above-identified patent and that said Letters Patent is hereby corrected as shown below:

In column 6, lines 60-65,

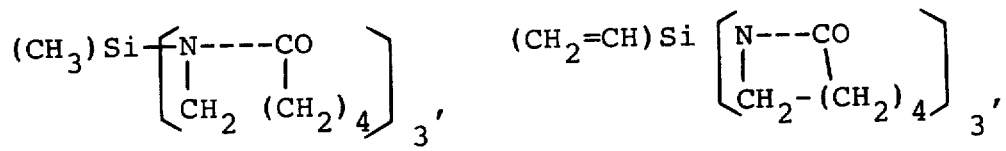

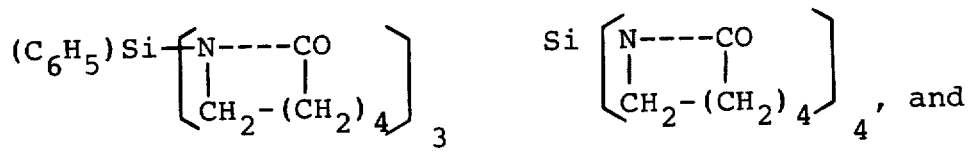

should read

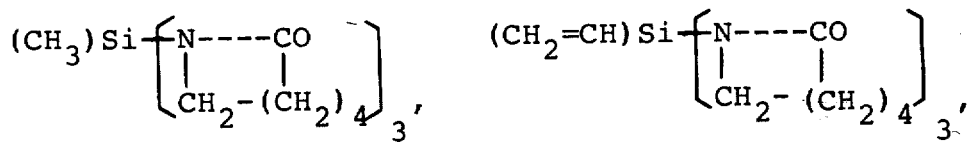

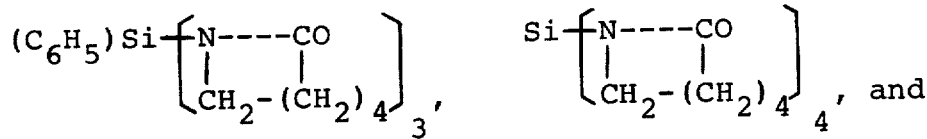

UNITED STATES PATENT AND TRADEMARK OFFICE
CERTIFICATE OF CORRECTION

PATENT NO. : 4,387,177
DATED : June 7, 1983
INVENTOR(S) : Katsutoshi Mine, Tadao Tamaki It is certified that error appears in the above-identified patent and that said Letters Patent is hereby corrected as shown below:

In column 7, line 25, "if" should read -- is --.

In column 8, line 20, "this" should read -- thus --.

In column 11, Table III under the "Components" column,

"MeSi(N$\underset{\underset{\text{CMe}}{|}}{\overset{\overset{\text{MeO}}{|}}{}}$)$_3$, parts" should read -- MeSi(N$\underset{\underset{\text{CMe}}{\overset{||}{O}}}{\overset{\overset{\text{Me}}{|}}{-}}$)$_3$, parts --.

In column 14, line 39, "dibutylindioctoate" should read -- dibutyltindioctoate --.

Signed and Sealed this

Thirtieth Day of April 1985

[SEAL]

Attest:

DONALD J. QUIGG

Attesting Officer     Acting Commissioner of Patents and Trademarks